M. ACKERMAN.
NUT LOCK.
APPLICATION FILED AUG. 8, 1913.
1,110,996.
Patented Sept. 15, 1914.
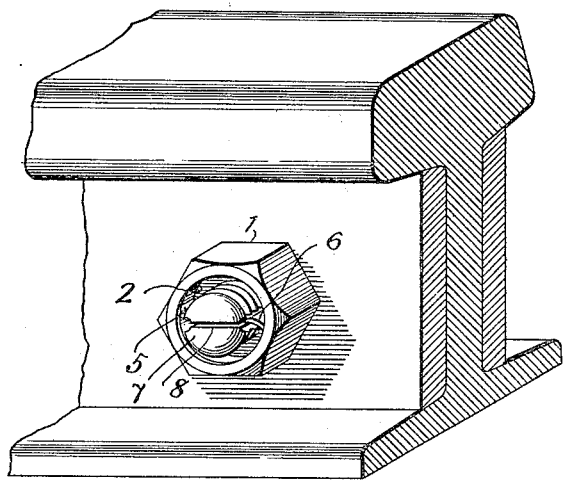
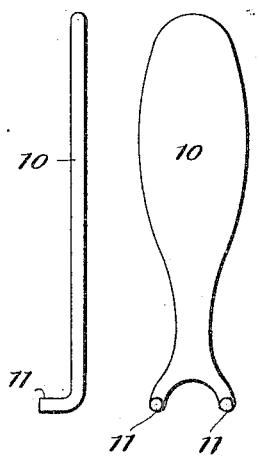
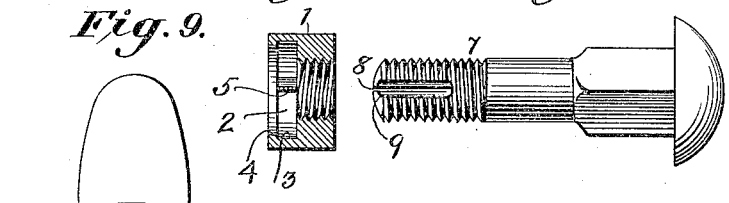
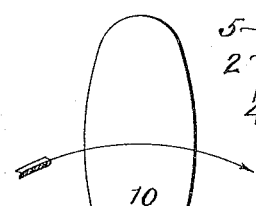
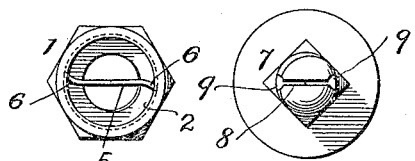
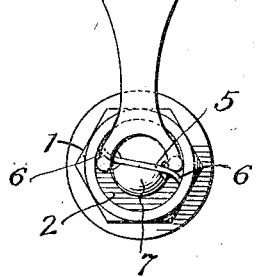
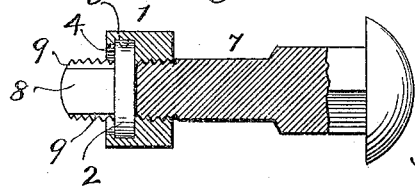
WITNESSES
INVENTOR
Maurice Ackerman

UNITED STATES PATENT OFFICE.

MAURICE ACKERMAN, OF WASHINGTON, DISTRICT OF COLUMBIA, ASSIGNOR OF TWO-FIFTHS TO SAMUEL KRUCOFF, OF WASHINGTON, DISTRICT OF COLUMBIA.

NUT-LOCK.

1,110,996.  Specification of Letters Patent.  Patented Sept. 15, 1914.

Application filed August 8, 1913. Serial No. 783,751.

*To all whom it may concern:*

Be it known that I, MAURICE ACKERMAN, a subject of the King of Great Britain, residing at Washington, in the District of Columbia, have invented a certain new and useful Improvement in Nut-Locks, of which the following is a full, clear, and exact description.

This invention relates to the type of nut-locks in which an added element engages both the nut and the bolt to prevent the nut from accidentally running off the bolt and also from being surreptitiously removed.

The invention consists of a nut lock in which the nut is made with an undercut, smooth surfaced groove in its outer portion and surrounding its threaded bore, and carrying a spring dogging device, and the bolt is made with a longitudinal slit to receive the spring dogging device, which engages the smooth surface of the groove and thereby prevents retrograde movement of the nut and yet allows of its constant advance, and which, by a suitable tool, may be disengaged so as to permit the nut to be run off of the bolt whenever desired; the nut and dogging device being capable of being used over and over again, all as I will proceed now to explain and finally claim.

In the accompanying drawings, illustrating my invention, in the several figures of which like parts are similarly designated, Figure 1 is a perspective view of a rail-joint with one of my nut-locks in place. Fig. 2 is a cross-section of the nut and dog therein. Fig. 3 is an elevation of the bolt. Fig. 4 is a top view of the nut. Fig. 5 is a top view of the bolt. Fig. 6 is a longitudinal section of the assembled parts, excepting that the head of the bolt is shown in elevation. Fig. 7 is a side view, and Fig. 8 is a plan view of a wrench for use in removing the nut. Fig. 9 is a plan view illustrating the use of the wrench of Figs. 7 and 8.

The nut 1, may be of usual construction, excepting that it has an undercut groove 2 made in its outer portion or face. This groove has its bottom 3, smooth. The flange 4 need have only enough overhang over the groove to prevent the escape of the dog 5. This dog 5 is of spring metal, with its ends 6 curved, the whole somewhat resembling an elongated S, to engage the bottom of the groove and capable of being further curved to release its hold on the bottom of the groove. The bolt 7 is provided with a longitudinal slit 8, which extends through the threaded shank only far enough to allow the nut to be run on the full length of the thread. The edges of this slit 8 may be grooved, as at 9, to permit free play of the dog.

When the bolt is in place, as in a rail-joint, Fig. 1, the nut with the dog in it, is placed upon the end of the bolt so that the dog will enter the slit in the bolt, and then the nut is turned home. The ends of the dog are curved in the direction of rotation necessary to screw on the nut and so offer no resistance to such placing of the nut. When, however, there is any effort made tending to release or remove the nut, the ends of the dog engage the bottom of the groove in the nut and tend to straighten out and hence resist and prevent the escape of the nut. By this construction, no teeth or their equivalents need be used in or on the nut. When it is desired to remove the nut, the ends of the dog are bent over in the direction of their curvature so as to release their grip on the nut, and then the nut may be turned off. A suitable tool for this purpose is shown in Figs. 7, 8, and 9, the same consisting of a handle 10, having the depending fingers 11 adapted to enter the grooved end of the nut and engage the ends of the dog as indicated in Fig. 9, and then by movement of the wrench in the direction of the arrow Fig. 9, the dog's ends may be bent further in the direction of their curvature to release them from engagement with the groove, and the nut then may be run off. This may be done without impairing the further usefulness of either the nut, bolt, or dog.

The invention is susceptible of modifications within the scope of the appended claims.

What I claim is:—

1. A nut-lock, comprising a longitudinally slit bolt, a nut having an undercut groove in its outer portion or face, and a dog engaging the slit in the bolt and having its ends projecting outwardly beyond the bolt and curved in the direction of that rotation of the nut necessary to apply the nut to the bolt, said ends located in said groove and engaging the bottom of said groove to resist the removal of the nut.

2. In a nut-lock, a nut having an undercut smooth bottomed groove in its outer portion or face, a bolt slitted longitudinally, and a spring dog arranged in said slit and having curved ends located wholly within the groove and adapted to spring into frictional engagement with said smooth bottom and capable of being disengaged therefrom by further curvature in the same direction by means of an independent tool.

3. A nut-lock, comprising a longitudinally slit bolt, the edges of the slit being grooved, a nut provided within its outer face with an undercut groove, and an S spring located in said groove and engaging the slit in the bolt and the bottom of the groove in the nut.

In testimony whereof I have hereunto set my hand this 8th day of August A. D. 1913.

MAURICE ACKERMAN.

Witnesses:
WM. H. FINCICEL,
SAMUEL KRUCOFF.

Copies of this patent may be obtained for five cents each, by addressing the "Commissioner of Patents, Washington, D. C."